US009777705B2

(12) United States Patent
Neumann et al.

(10) Patent No.: US 9,777,705 B2
(45) Date of Patent: Oct. 3, 2017

(54) METHOD FOR RE-INDEXING A PITCH BEARING OF A WIND TURBINE

(71) Applicant: General Electric Company, Schenectady, NY (US)

(72) Inventors: Ulrich Werner Neumann, Simpsonville, SC (US); Brent Hamilton Holloway, Simpsonville, SC (US); Gaylon Mitchell Pfeiffer, Tampa, FL (US); Stephanie Willman, Greenville, SC (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 14/848,479

(22) Filed: Sep. 9, 2015

(65) Prior Publication Data

US 2017/0067437 A1    Mar. 9, 2017

(51) Int. Cl.
*F03D 1/06* (2006.01)
*F03D 13/30* (2016.01)
*F03D 80/50* (2016.01)

(52) U.S. Cl.
CPC ........... *F03D 1/0658* (2013.01); *F03D 13/30* (2016.05); *F03D 80/50* (2016.05); *F05B 2240/916* (2013.01)

(58) Field of Classification Search
CPC .......... B23P 6/002; B23P 6/00; F03D 1/0658; F03D 13/30; F03D 13/35; F03D 80/50; F05B 2260/79
See application file for complete search history.

(56) References Cited

U.S. PATENT DOCUMENTS 7,726,941 B2    6/2010 Bervang
8,584,355 B2    11/2013 Holling
2014/0255186 A1    9/2014 Yenigun et al.

*Primary Examiner* — Christopher Besler
(74) *Attorney, Agent, or Firm* — Dority & Manning, P.A.

(57) ABSTRACT

A method is provided for re-indexing a pitch bearing configured with a rotor blade of a wind turbine. A hoisting system is anchored within the rotor hub and includes a plurality of support elements connected to a drive system. The support elements are connected to the root flange of the rotor blade, and the rotor hub is rotated so that the rotor blade is in a vertical six o'clock position. The root flange is disconnected from the inner race such that the rotor blade is fully supported by the hoisting system. With the hoisting system, the rotor blade is lowered a predetermined distance from the hub and the pitch bearing is re-indexed to a position so as to engage a new set of pitch bearing teeth with a pitch drive that engages the pitch bearing.

11 Claims, 5 Drawing Sheets ized energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is configured operably between the hub and the rotor blade to allow for rotation of the rotor blade about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

METHOD FOR RE-INDEXING A PITCH BEARING OF A WIND TURBINE

FIELD OF THE INVENTION

The present subject matter relates generally to wind turbines and, more particularly, to systems and methods for re-indexing a pitch bearing of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is configured operably between the hub and the rotor blade to allow for rotation of the rotor blade about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation, a pitch bearing may become worn causing one or more of the rotor blades to move from a desired pitch setting. The normal operational pitch range of the rotor blades is generally far less than the complete circumferential range of the bearing and, in the event of a worn sector of the bearing, the bearing can be indexed to a new sector relative to the pitch drive gear/motor. This procedure is typically carried out by removing and lowering the rotor blade, indexing the pitch bearing so to engage a new set of pitch bearing teeth, and raising and re-attaching the rotor blade. Current systems and methods for removing rotor blades utilize large, specialized cranes because the cranes must have load capacity to lower the blade from the hub to the ground and then back up to the height of the hub. Such cranes are costly to use, lease, and/or maintain, and often require dedicated road construction simply to bring the crane to the wind turbine site.

Thus, an improved system and method for re-indexing a pitch bearing of a wind turbine would be advantageous. For example, a system and method for re-indexing a pitch bearing of a wind turbine wherein the rotor blade need not be lowered to the ground would be desired in the art.

BRIEF DESCRIPTION OF THE INVENTION

Aspects and advantages of the invention will be set forth in part in the following description, or may be obvious from the description, or may be learned through practice of the invention.

In one aspect, the invention provides a method for re-indexing a pitch bearing configured with a rotor blade of a wind turbine, wherein the pitch bearing is operably coupled between a hub and the rotor blade. The pitch bearing has a fixed outer race and a rotatable inner race, with the rotor blade having a root flange bolted onto the inner race. The method includes anchoring a hoisting system to a suitable anchor point within the hub (or directly onto the hub) that can sustain the weight of the system and the rotor blade that will eventually be suspended from the hoisting system. The hoisting system includes a plurality of support elements connected to a drive system, wherein the support members are connected to the root flange of the rotor blade without the necessity of detaching the rotor blade bolts from the inner race. The rotor hub is rotated so that the subject rotor blade is moved to a vertical six o'clock position either before or after attaching the support elements. Once the support elements are attached, the root flange is disconnected from the inner race such that the rotor blade is fully supported by the hoisting system. Then, using the hoisting system, the rotor blade is lowered a predetermined distance from the hub and the pitch bearing is re-indexed to a position so as to engage a new set of pitch bearing teeth.

In a certain embodiment, the hoisting system is a cable or chain hoisting system with a plurality of respective cable or chain support elements that are fixed to attaching points that are already present on the root flange or are installed on the root flange. For example, the method may further include installing mount devices onto the root flange and connecting the cable or chain support elements onto the mount devices prior to disconnecting the root flange from the inner race. Such mount devices may be clamps or other suitable mechanical attaching devices installed on the root flange between rotor blade bolts that attach the root flange to the inner race. For example, clamps may be attached on a shoulder or circumferential ledge formed in the root flange between the rotor blade bolts. Alternatively, mount devices (e.g., threaded eye bolts, or the like) may be threaded into holes defined in the root flange at different locations around the circumference of the root flange. Once the cable or chain support elements are attached, the root flange can be subsequently disconnected from the inner race by unbolting the rotor blade bolts from the inner race.

It may be desired to attach one or more second mount devices as safety devices onto the root flange, for example by bolting such second mount devices onto the exposed rotor blade bolts after the rotor blade has been lowered, and connecting safety securing elements (e.g., additional cables or chains) between the rotor hub and the second mount devices.

The method in one embodiment may include lowering the rotor blade on the cable or chain supports with a single drive unit connected to the plurality of cable or chain supports. For example, this drive unit may be supported on a girder or beam system that is suspended across the blade root opening in the rotor hub so as to be generally centered in the opening. Multiple cable or chain supports can then be connected to the single drive unit for commonly lowering and raising the rotor blade in a level manner.

In another embodiment, the rotor blade is lowered on the cable or chain supports with an individual respective drive unit connected to each cable or chain support. The individual drive units may be anchored around the rotor hub adjacent to where the cable or chain support elements are connected to the rotor flange. For example, the individual drive units may be mounted onto the fixed outer race at locations corresponding to where the cable or chain support elements are connected to the root flange.

An embodiment may further include attaching a blade harness and at least one tail end support line to the rotor blade, wherein the tail end support line is attached to the blade harness and a tail pick crane.

The method may also include re-connecting the rotor blade to the rotor hub after re-indexing the pitch bearing by engaging the drive system to raise the support elements and rotor blade until the rotor blade bolts engage through the inner race. The rotor blade bolts are then bolted to the inner race, and the support elements are subsequently disconnected from the root flange.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
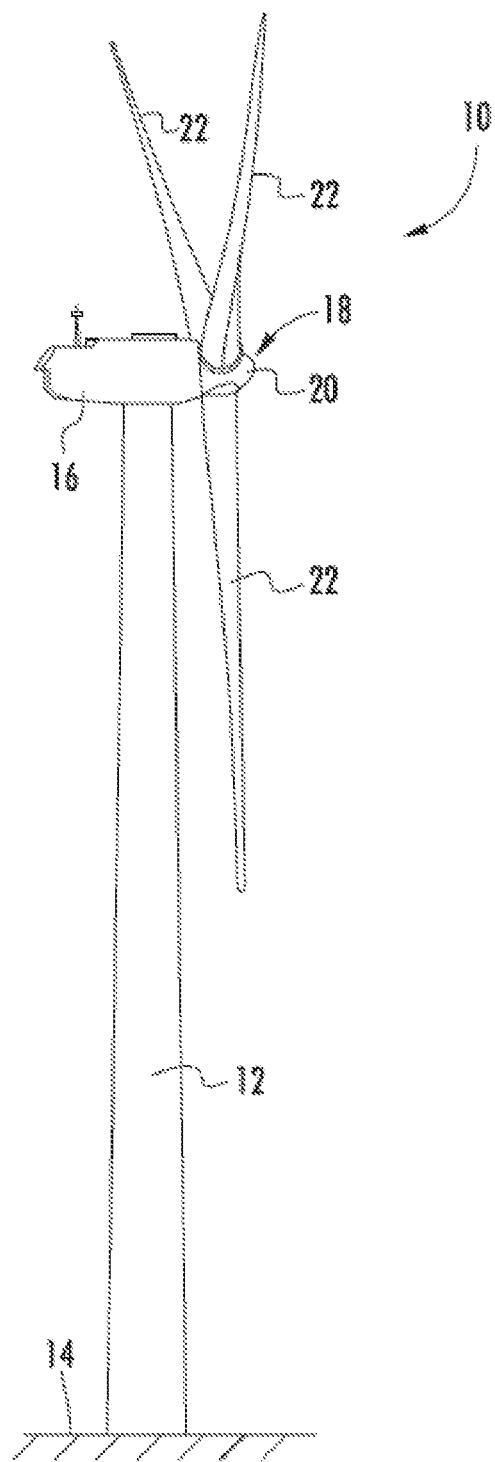
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 is operatively coupled to the rotor 18 by a pitch bearing (not shown). Further, each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
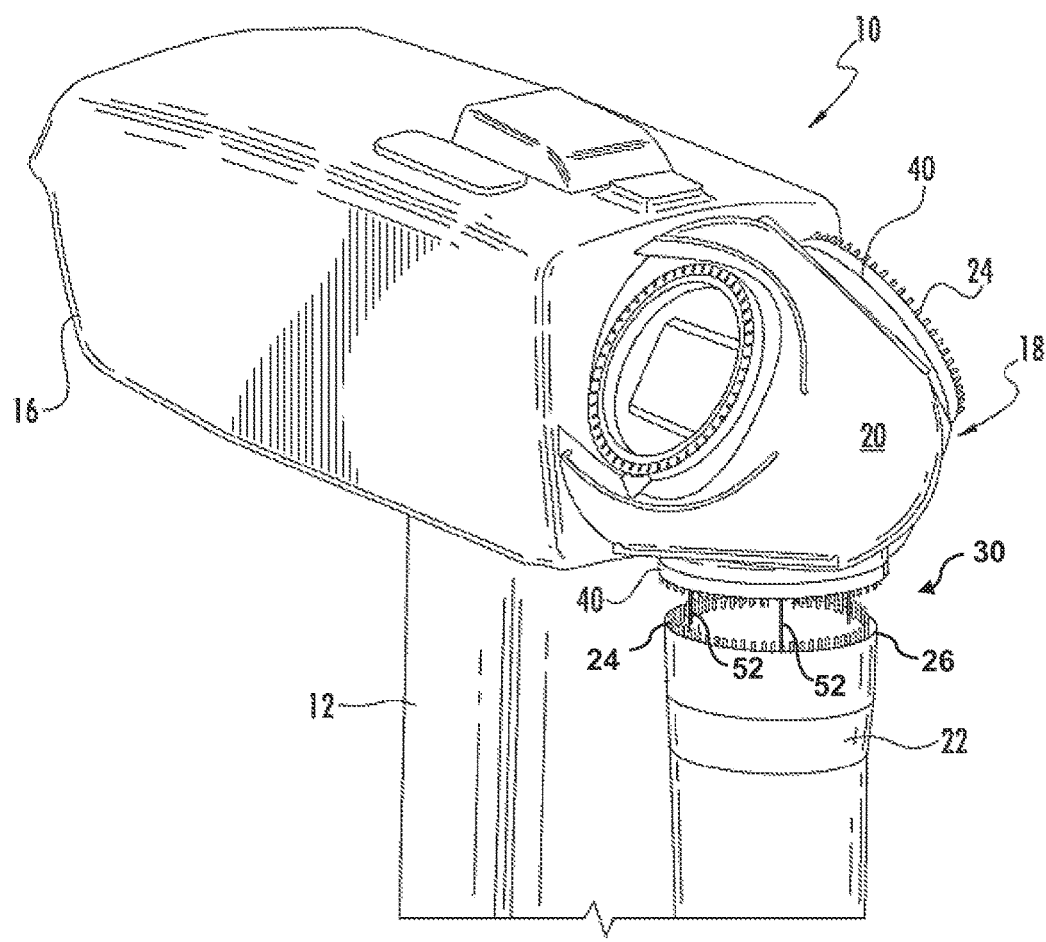
FIG. 2 illustrates an exploded view of a method for re-indexing a pitch bearing according to the present disclosure.

Referring now to FIG. 2, an exploded view of a system 30 that may be used in various method embodiments for re-indexing a pitch bearing 40 of a wind turbine in accordance with aspects of the invention is illustrated. The system 30 may include a plurality of support elements 52 attached to the root flange 26 of the rotor blade 22 without the necessity of removing the rotor blade bolts 24 that attached the blade 22 to the hub 20. As generally understood by those skilled in the art, root flange 26 is bolted to an inner race of the pitch bearing 40 via the bolts 24, and the inner race engages with a fixed race that is bolted to the hub 20. In FIG. 2, the rotor blade 22 is depicted in a vertically oriented six o'clock position relative to rotor hub 20 for lowering the blade 22 in accordance with the methods described herein.

Referring to FIGS. 3 through 6 in general, the method includes anchoring a hoisting system 30 to a suitable anchor point within the hub 20 that can sustain the weight of the system 30 and the rotor blade 22 that will eventually be suspended from the hoisting system 30. The hoisting system 30 utilizes a drive unit 62 that may be an electrically driven system, hydraulic system, engine-driven system, and so forth, that can be readily transported through the nacelle 16 and into the rotor hub 20 where the system 30 is bolted, clamped, or otherwise attached to a structural member within the hub 20 (or directly to the hub 20) that allows access to the blade 22 and can support the weight of the blade 22 during the re-indexing procedure.

The hoisting system 30 includes a plurality of support elements 52 connected to a drive system 30 to be raised or lowered by the system 30. The support elements 52 are connected to the root flange 26 of the rotor blade 22 without the necessity of detaching the rotor blade bolts 24 from the inner race 44. The rotor hub 20 may be rotated so as to position the respective blade 22 at a vertical six o'clock position as depicted in FIG. 2 either before or after attaching the support elements 52 to the root flange 26.

Once the support elements 52 are connected, the root flange 26 is disconnected from the inner race 44 (e.g., by unbolting the rotor blade bolts 24) such that the rotor blade 22 is fully supported by the hoisting system. Then, using the hoisting system 30, the rotor blade 22 is lowered a predetermined distance from the hub 20 and the pitch bearing 40 is re-indexed to a position so as to engage a new set of pitch bearing teeth. The actual method of re-indexing the pitch bearing 40 is well known to those skilled in the art and need not be described in detail herein for an appreciation or understanding of the present invention.

Figure 3:
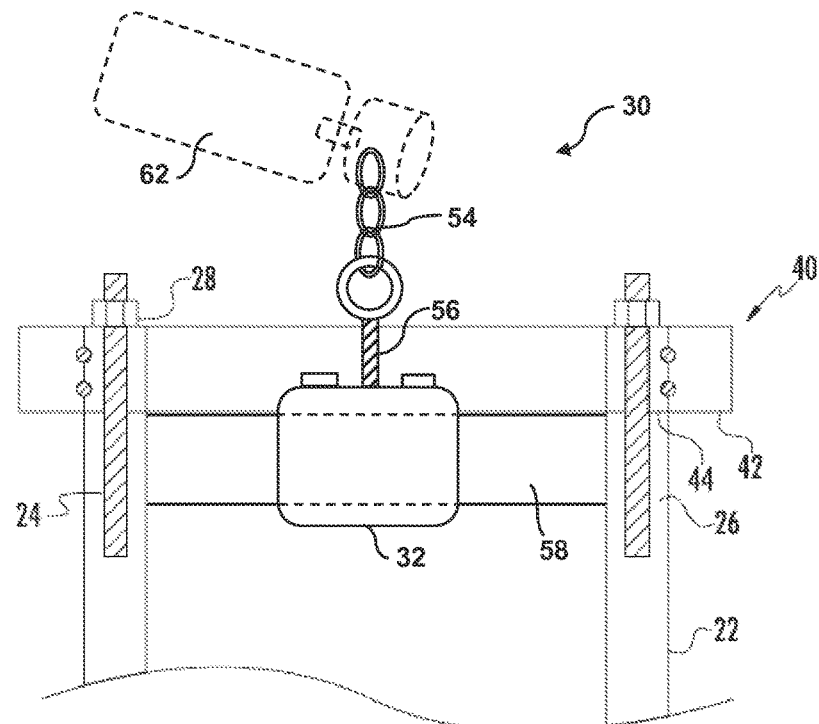
FIG. 3 illustrates one embodiment of a drive system and associated support elements attached to the root flange of a rotor blade used in the present method.

In certain embodiments as depicted in the figures, the hoisting system 30 is a cable or chain hoisting system 30 with a plurality of respective cable or chain support elements 54 that are fixed to attaching points that are already present on the root flange 26 or are installed on the root flange 26 as part of the present procedure. For example, referring to FIG. 3, the method may further include installing mount devices 32 onto any suitable location on the root flange 26 and connecting the cable or chain support elements 54 onto the mount devices 32 prior to disconnecting the root flange 26 from the inner race 44. The mount devices 32 may be, for example, clamps, blocks, or other suitable mechanical attaching devices installed (e.g., bolted, welded, etc.) on the root flange 26 between rotor blade bolts 24, as depicted in FIG. 3. For example, a plurality of clamps 32 may be attached on a shoulder or circumferential ledge 58 formed in the root flange 26 between the rotor blade bolts 24. Alternatively, the mount devices 32 may be threaded into holes defined in the root flange 26 at different locations around the circumference of the root flange 26. The mount devices 32 may include threaded eye bolts 56 or other suitable means to attach the cable or chain support elements 54. Once the cable or chain support elements 54 are attached to the mount devices 32, the root flange 26 can be subsequently disconnected from the inner race 44 by unbolting the rotor blade bolts 24 from the inner race 44.

As mentioned, the rotor blade is lowered using the hoisting system 30 after the cable or chain supports 54 are connected to the root flange 26. For this, the system 30 may use a single drive unit 62 connected to the plurality of cable or chain support elements 54. For example, referring to the embodiment of FIG. 5, the single drive unit 62 may be supported on a girder or beam system 64 that is suspended across the blade root opening in the rotor hub 20 so as to be generally centered in the opening. Multiple cable or chain support elements 54 can then be connected to the drive unit 64 and commonly driven for lowering and raising the rotor blade 22 in a level manner.

Figure 4:
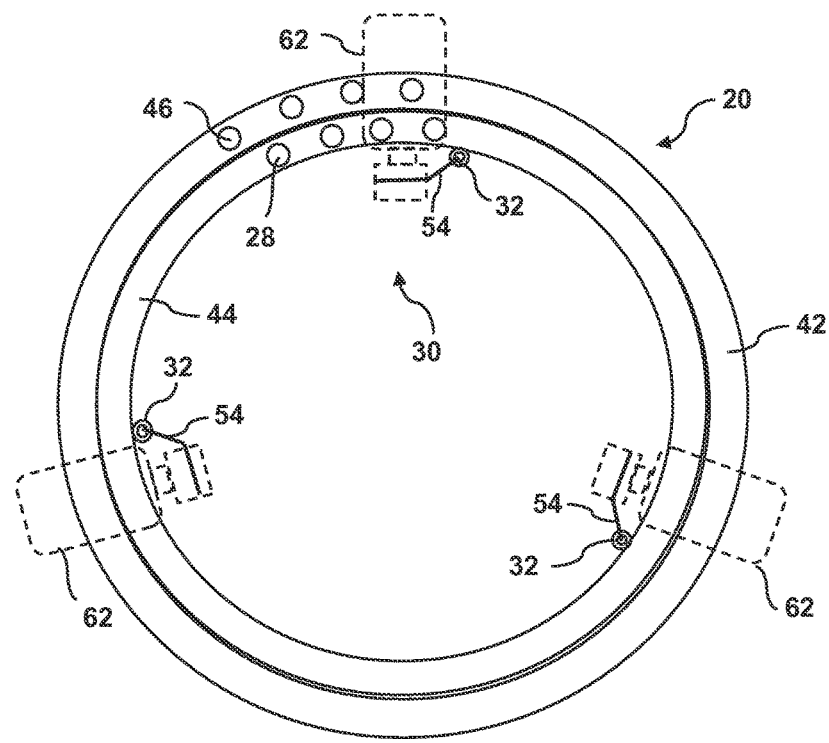
FIG. 4 is a top diagram view of an embodiment of a drive system utilizing multiple drive units positioned around the fixed outer race used in the present method.
Figure 5:
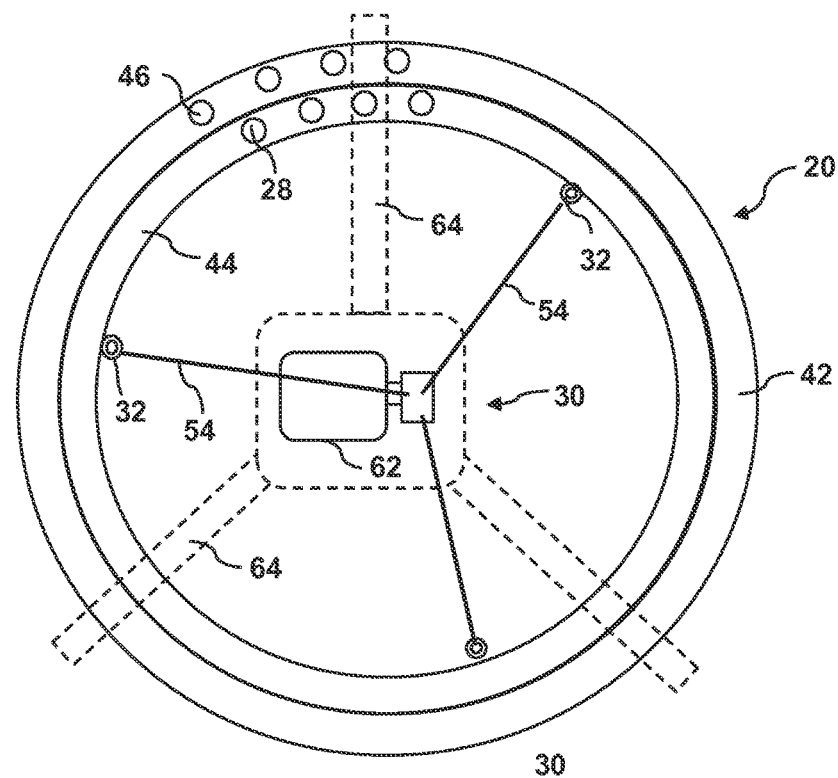
FIG. 5 is a top diagram view of an embodiment of a drive system utilizing a single drive unit suspended and centered over the root flange used in the present method.

In another embodiment as depicted in FIG. 4, the rotor blade is lowered on the cable or chain supports elements 54 with an individual respective drive unit 62 connected to each cable or chain support 54. For example, the individual drive units 62 may be anchored around the rotor hub 20 adjacent to where the cable or chain support elements 54 are connected to the rotor flange 26. In the depicted embodiment, the individual drive units 62 are mounted onto the fixed outer race 42 at locations corresponding to where the cable or chain support elements 54 are connected to the root flange 26.

Figure 6:
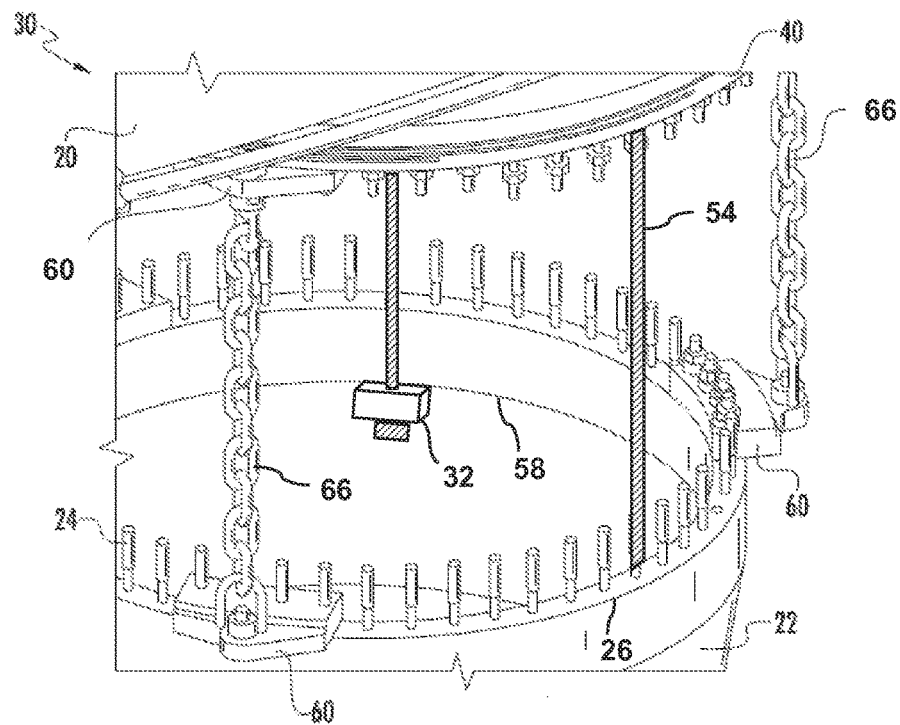
FIG. 6 is a partial perspective view illustrating second safety mounting devices and chains that may be used in the method of the present invention.

Referring to FIG. 6, it may be desired to attach one or more second mount devices 60 as safety devices onto the root flange 26 of the rotor blade 22. For example, the second mount devices 60 may be blocks or clamps that are bolted onto the inner race 44 or outer race 42, as well as onto the exposed rotor blade bolts 24 after the rotor blade 22 has been unbolted and lowered from the inner race 44. Safety securing elements 66 (e.g., additional cables or chains) may then be connected between the sets of second mount devices 60, as depicted in FIG. 6.

Figure 7:
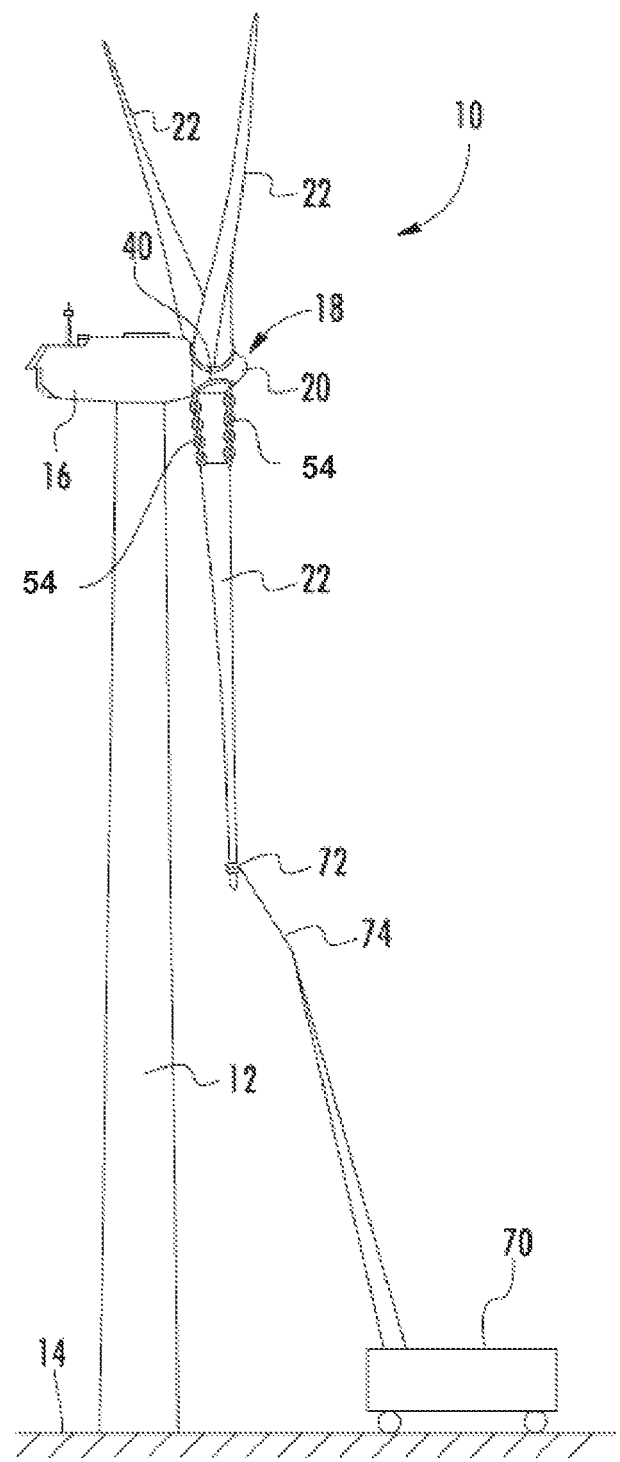
FIG. 7 illustrates a method embodiment wherein a blade harness and at least one tail end support line are attached to the rotor blade and a tail pick crane.

Referring to FIG. 7, a method embodiment may further include attaching a blade harness 72 to the rotor blade 22. The blade harness 72 may be any suitable harness known in the art and may wrap around the entire blade or a portion thereof. Further, the blade harness 72 may also be attached to at least one tail end support line 74 that is attached to a tail pick crane 70. Such a configuration provides additional stability to the rotor blade 22 during the pitch bearing 40 re-indexing process.

The method may also include re-connecting the rotor blade 22 to the rotor hub 20 after re-indexing the pitch bearing 40 by engaging the drive system 30 to raise the support elements 54 and rotor blade until the rotor blade bolts 24 engage through the inner race 44. The rotor blade bolts 24 are then bolted to the inner race 44, and the support elements 54 are subsequently disconnected from the root flange 26.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for re-indexing a pitch bearing configured with a rotor blade of a wind turbine, the pitch bearing operably coupled between a hub and the rotor blade, the pitch bearing having a fixed outer race and a rotatable inner race, the rotor blade having a root flange bolted onto the inner race, the method comprising:
   anchoring a hoisting system within the hub, the hoisting system having a plurality of support elements connected to a drive system;
   connecting the support elements to the root flange of the rotor blade;
   rotating the hub so that the rotor blade is in a vertical six o'clock position;
   disconnecting the root flange from the inner race such that the rotor blade is fully supported by the hoisting system;
   with the hoisting system, lowering the rotor blade a predetermined distance from the hub;
   re-indexing the pitch bearing to a position so as to engage a new set of pitch bearing teeth with a pitch drive that engages the pitch bearing; and
   wherein the hoisting system is a cable or chain hoisting system, with the plurality of support elements being a plurality of respective cable or chain support elements, and the method further comprises fixing the cable or chain support elements to the root flange prior to disconnecting the root flange from the inner race.

2. The method as in claim 1, further comprising installing mount devices onto the root flange wherein the step of fixing the cable or chain support elements to the root flange comprises connecting the cable or chain support elements onto the mount devices prior to the step of disconnecting the root flange from the inner race.

3. The method as in claim 2, wherein the mount devices are installed on the root flange between rotor blade bolts that attach the root flange to the inner race, the root flange subsequently disconnected from the inner race by unbolting the rotor blade bolts from the inner race.

4. The method as in claim 3, further comprising threading one or more second mount devices onto the rotor blade bolts after the rotor blade has been lowered, and connecting safety securing elements between the rotor hub and the second mount devices.

5. The method as in claim 1, comprising lowering the rotor blade on the cable or chain support elements with a single drive unit connected to the plurality of cable or chain support elements.

6. The method as in claim 5, comprising anchoring the single drive unit to the rotor hub at a location such that the plurality of cable or chain support elements connected to the single drive lower the rotor blade by a uniform amount upon engagement of the single drive unit.

7. The method as in claim 1, comprising lowering the rotor blade on the cable or chain support with an individual respective drive unit connected to each cable or chain support element.

8. The method as in claim 7, comprising anchoring the individual drive units around the rotor hub where the cable or chain support elements are connected to the rotor flange.

9. The method as in claim 8, comprising anchoring the individual drive units onto the fixed outer race at locations corresponding to where the cable or chain support elements are connected to the root flange.

10. The method as in claim 1, further comprising attaching a blade harness and at least one tail end support line to the rotor blade, wherein the tail end support line is attached to the blade harness and a tail pick crane.

11. The method as in claim 1, wherein to re-connect the rotor blade to the rotor hub after re-indexing the pitch bearing, the drive system is engaged to raise the support elements and rotor blade until the rotor blade bolts engage through the inner race, the rotor blade bolts are bolted to the inner race, and the support elements are subsequently disconnected from the root flange.

* * * * *